Feb. 23, 1971          D. R. McMURTRY          3,564,934
                        LINK MECHANISM
Filed July 24, 1968                      3 Sheets-Sheet 1

Feb. 23, 1971   D. R. McMURTRY   3,564,934
LINK MECHANISM
Filed July 24, 1968   3 Sheets-Sheet 3

United States Patent Office 3,564,934
Patented Feb. 23, 1971

3,564,934
LINK MECHANISM
David R. McMurtry, Filton, Bristol, England, assignor to Rolls-Royce Limited, Derby, England, a British company
Filed July 24, 1968, Ser. No. 747,254
Claims priority, application Great Britain, July 25, 1967, 34,127/67
Int. Cl. F16h 21/44
U.S. Cl. 74—105                                   3 Claims

ABSTRACT OF THE DISCLOSURE

An exhaust nozzle for a gas turbine engine wherein the flow area of the nozzle is varied by flaps pivotally connected to a jet pipe and pivoted by movement of a shroud enclosing the flaps. The shroud acts on the petals through links and additionally through a cam which comes into operation when the link connection is in or near a dead centre position.

---

This invention relates to a link mechanism.

It is well known that when a link is used to transmit motion between an operating member and an output member, the mechanical advantage of the mechanism changes as the angular relationship between the link and the operating member changes, and there may be position of the link in which the mechanical advantage is zero. In that position the link may be said to be in a dead centre position. The possibility of the link approaching or even passing into the dead centre position limits the range of movement over which such a link can be employed to transmit motion. The main object of this invention is to overcome this limitation.

According to this invention there is provided a mechanism comprising an output member supported for motion through a determined range, an operating member movable for moving the output member through said range, and a link arranged for the transmission of motion from the operating member to the output member, characterized in that the link is arranged to transmit motion from the operating member to the output member only through a part of said range, and that a cam is arranged for the transmission of motion from the operating member to the output member through a further part of said range being a part in which the link is in a dead centre range.

An example of a mechanism according to this invention will now be described with reference to the accompanying drawings wherein.

Figure 1:
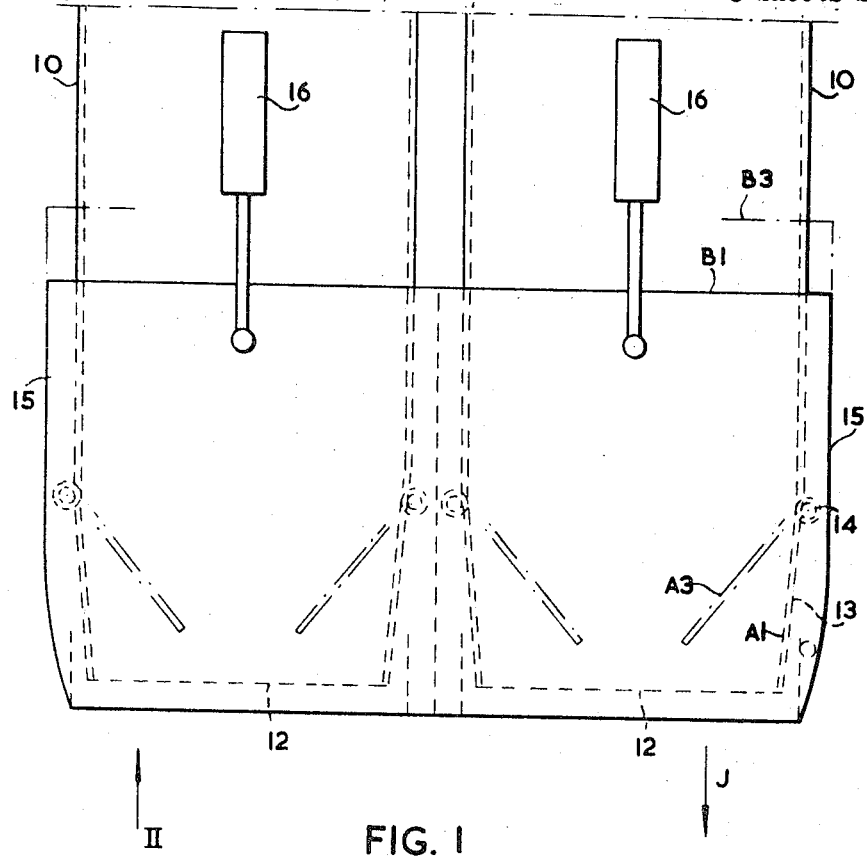
FIG. 1 is a plan view of a gas turbine exhaust installation including the mechanism.
Figure 2:
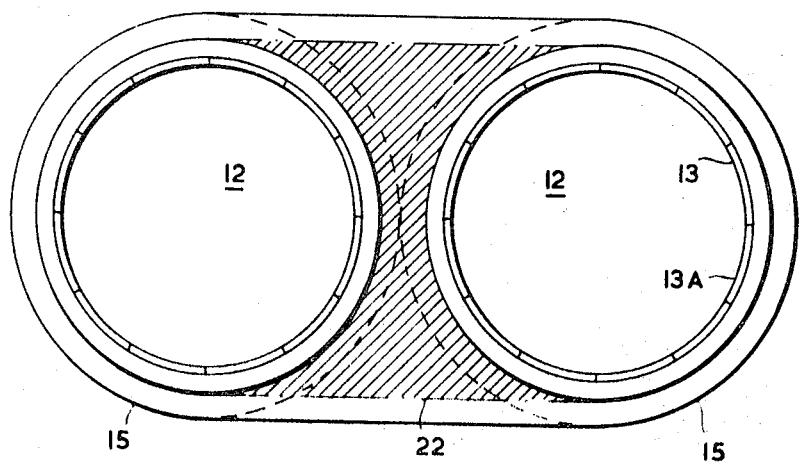
FIG. 2 is a view in the direction of arrow II in FIG. 1.

Referring to FIGS. 1, 2 the installation comprises two parallel juxtaposed jet pipes 10 each emanating from a jet engine (not shown) and each terminating in a nozzle 12. Each nozzle is formed by an annular array of flaps each connected to the associated jet pipe by a pivot 14, whose axis lies transverse to the jet, i.e. transverse to the mean direction, indicated J, of the flow through the nozzle. The angular position of the flaps determines the flow area of the nozzle, and the flaps are jointly pivotal between an "open" position A1 which the flow area is a maximum and a "closed" position A3 in which the flow area is a minimum.

The flaps of each nozzle are surrounded by an operating member or shroud 15 supported on the jet pipe 10 for linear movement therealong between an extended position B1 and a retracted position B3, the movement being effected by fluid pressure motors 16. The shrouds of the two nozzles are integral as shown in FIGS. 1, 2. Each flap is connected to the associated shroud by a toggle link 17 having pivots 18 and 19 connecting it to the shroud and to the flap, respectively, and the link cooperates to pivot the flap when the shroud is moved by the motors 16.

Figure 4:
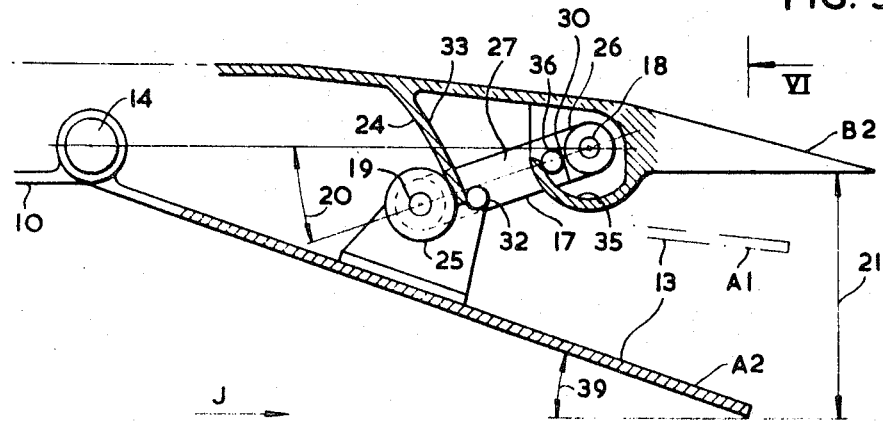
FIGS. 4 and 5 show the structure of FIG. 3 in different operational positions.

FIG. 4 shows the flap 13 in a position A2 intermediate between the open and closed positions A1, A3. The corresponding position of the shroud 15 is denoted B2. A toggle angle 20 is formed between a line connecting the pivots 14, 18 and a line connecting the pivots 18, 19, and it is clear that if the angle 20 approaches zero the mechanical advantage of the transmission of force from the shroud to the flap approaches zero. If the angle 20 becomes unduly small the link 17 is said to be in the dead centre range relative to the pivot 14. As will be shown, means are introduced to make it possible for the shroud to pivot the flap notwithstanding the link 17 being in the dead centre range. If such means were not provided it would not be possible to open the flap beyond the position A2 and there would be a distance 21 at the base of the nozzle which defines the width of an annular area of base drag on an aircraft in respect of which the assembly is provided. In a single nozzle installation this difficulty could be overcome by providing a tapered downstream extension for the shroud, but in a twin nozzle installation as illustrated it is not easy to overcome the problem by such an extension because in the area between the two nozzles (FIG. 2) there will always be a portion 22 (shown hatched) in respect of which it is very awkward to provide such an extension.

The means whereby the flap is pivoted while the link 17 is in the dead centre range comprises a cam 24 and roller follower 25 provided respectively on the shroud 15 and the flap 13 and cooperating to take the place of the link 17 when the latter is in the dead centre range. Thereby the distance 21 is reduced to a minimum as shown at 21a (FIG. 3) and the area 22 is reduced to the minimum shown in FIG. 2.

Figure 3:
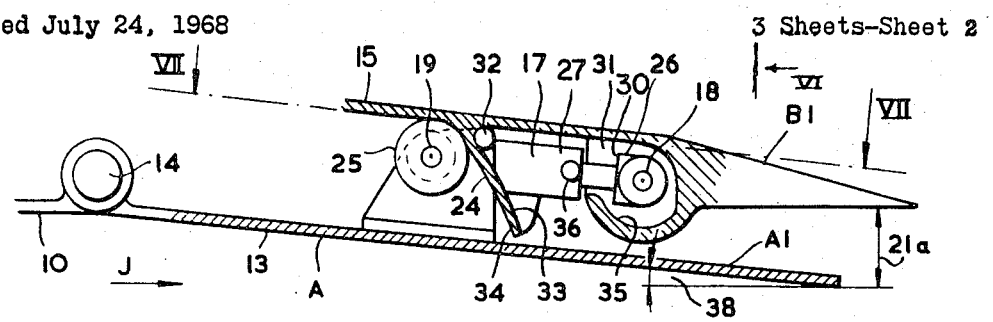
FIG. 3 is an enlarged detail of FIG. 1.

To make it possible for the cam 24 to act, the link 17 is made extensible (FIG. 3) in that the pivots 18 and 19 are embodied respectively in two parts 26 and 27 which are relatively slideable between stops 29, 30 on the member 26. As shown in FIG. 3 when the flap is in the open position A1 and the link 17 is virtually in the dead centre position, the link is extended revealing a gap 31 at the stop 30.

Assuming now that the shroud 15 is moved from the extended position B1 (FIG. 3) towards its retracted position B3 (FIG. 5), the link 17 contracts so as to allow the shroud 15 to move and the cam 24 acts on the roller 25 and moves the flap away from the open position A1 (FIG. 3) at the same time breaking the dead centre condition of the link 17. When the position A2 (FIG. 4) is reached the toggle angle 20 is sufficiently large for operation through the toggle link. The cam 24 is therefore dimensioned to extend no further than is necessary to bring the flap into the position A2 while the link 17 is dimensioned to have reached the contracted condition upon attainment by the flap of the position A2. Continued movement of the shroud 15 then results in the flap being moved solely through the intermediary of the link until the closed position A3 (FIG. 5) is reached.

In the present example the range of movement of the flap is such that, in the open position, the flap 13 is not allowed to reach parallelism with the jet but forms a small angle 38 of about 5 degrees therewith to ensure that the nozzle has a defined throat at the downstream end of the flap. In the position A2 the flap forms in relation to the jet an angle 39 which corresponds to the end of the dead centre range of the link 17 and is taken to be about 18 degrees. In the position A3 the flap has an angle 39 of about 40 degrees to the jet. The total range of movement of the flap is therefore about 35 degrees. In the absence of the cam means 24, 33 the range of flap movement would be reduced to that between the positions A2, A3, i.e. to about 22 degrees, and to restore this loss of range of flow area the diameter of the nozzle would have to be increased so that the penalty in terms of base drag is occasioned not only by the distance 21 but also by the larger diameter over which this distance would have to be arranged.

In addition to the roller 25, the flap 13 also supports a second follower member 32 positioned to engage a second cam 33 provided on the shroud 15. As shown, the cams 24, 33 are formed at opposite faces of an elongate cam body 34 adapted to pass between the followers 25, 32 (FIGS. 3, 4). The purpose of the cam and follower 33, 32 is to effect the return of the flap 13 from the position A2 into the open position A1. When the relevant engine 10 is running, such return is of course effected by the gas pressure exerted by the jet on the flap 13. Thus the cam and follower 33, 32 are only a safety precaution in case the flap sticks during return to the open position or to make testing of the flap mechanism possible when the engine is not running.

The shroud 15 also has secured thereto a cam 35 engaging a follower 36 provided on the part 27 of the link 17. The cam and follower 35, 36 cooperate to retain the parts 26, 27 in the contracted relationship when the flap is out of engagement with the cams 24, 33, i.e. when the flap is moved between the positions A2 and A3 and the cam 35 is so dimensioned that the follower 36 is out of engagement therewith when the flap is moved between the positions A1 and A2. The purpose of the cam and follower 35, 36 is to ensure that the link is kept in the contracted position so as to retain the flap in the intended angular position while out of range of the cams 24, 33. When the relevant engine is running the pressure of the jet on the flap will prevent extension of the link 17 but, as in the case of the cams 24, 33, the cam and follower 35, 36 are a precaution in case the flap sticks and they make testing of the flap mechanism possible when the engine is not running.

Figure 5:
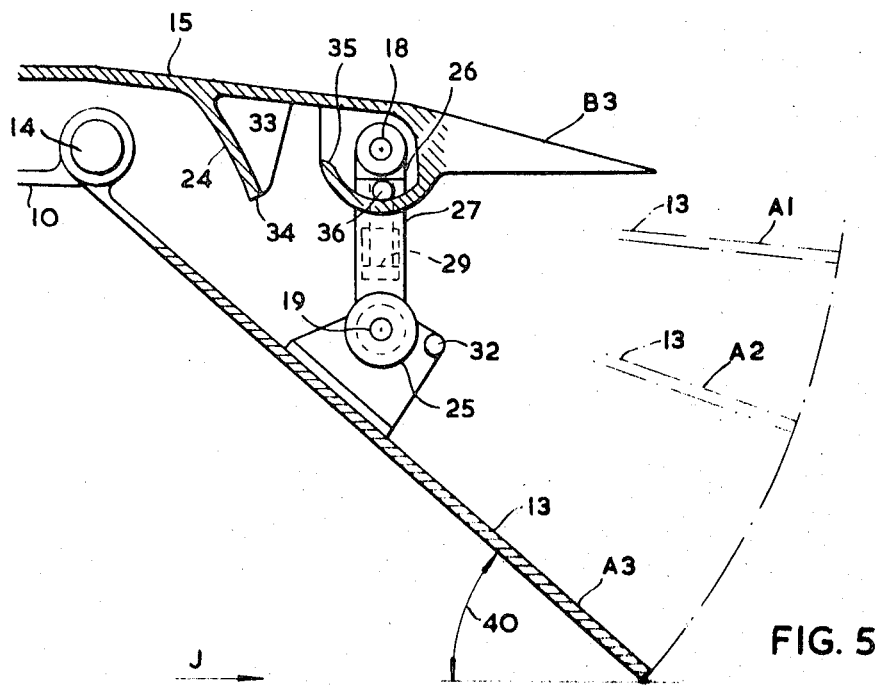
Figure 6:
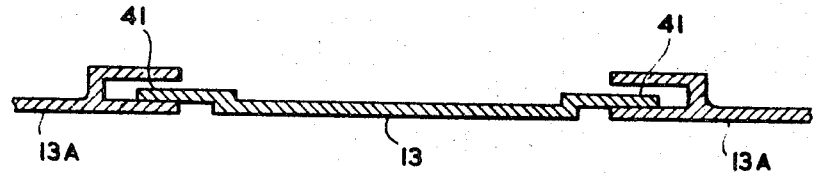
FIG. 6 is a developed section on the line VI—VI in FIG. 3.
Figure 7:
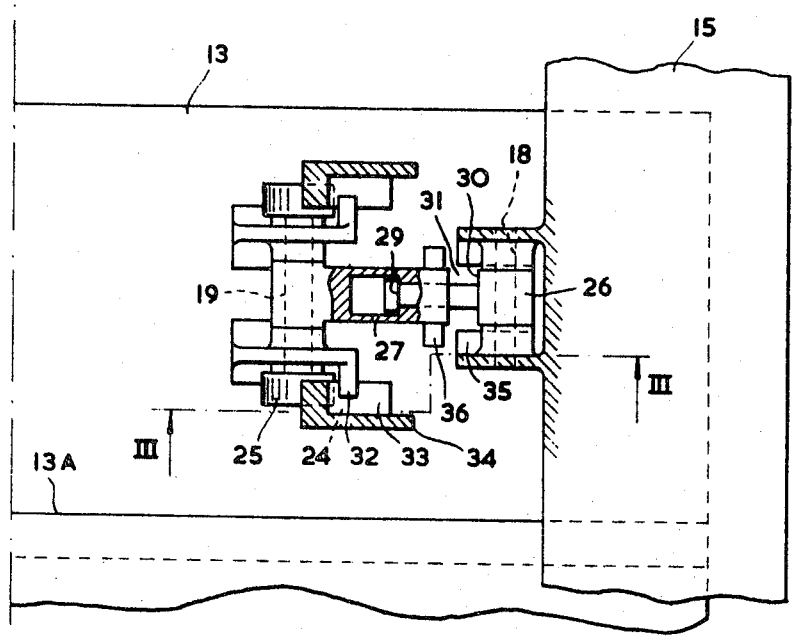
FIG. 7 is a section on the line VII—VII in FIG. 3.

It will be understood that the mechanism illustrated in FIGS. 3, 4 and 5 applies to all those flaps which are positively driven, i.e. every other flap of the annular assembly of flaps of either nozzle 12. The remaining flaps, denoted 13A (FIG. 6) are driven, in a manner well known per se by interleaved engagement with the flaps 13 as at 41.

What I claim is:

1. A mechanism comprising a first operating member, means supporting said member for linear motion, a second operating member, means supporting the second operating member for pivotal motion, a first pivot provided on the first operating member substantially on a line intersecting the pivotal axis of the second member and parallel to the direction of motion of the first member, a second pivot provided on the second operating member, a link connected between the pivots for the transmission of motion from the first to the second member, the members and the link being movable through a range having a part in which the link is situated in a dead centre position as far as said transmission of motion is concerned, a cam connected to one of the members, a cam follower for said cam connected to the other member, the cam and follower being adapted to engage for transmission of motion from the first to the second member in one direction of motion of the first member and only when the members are situated in said dead centre part, slide means connecting the link to the members for sliding motion relative thereto, stop means cooperating to limit said sliding motion when taking place in said one direction from the dead centre part into the remainder of the range so that when on completion of the movement of the first member through the dead centre part the cam ceases to transmit motion the stop means cause the link to commence the transmission of motion.

2. Apparatus according to claim 1 comprising an element connected to one of the members in a position relative to the pivot provided thereon so as to be engaged by the link during angular movement thereof about the pivot when during movement of the first member in said one direction the link commences the transmission of motion and by such engagement inhibit said sliding motion in the direction opposite to that in which it is limited by the stop means.

3. Apparatus according to claim 1 wherein the link comprises two parts respectively connected to said first and second pivots, and wherein said slide means are defined by a slide connecting said two parts for sliding motion in the direction of the length of the link.

References Cited

UNITED STATES PATENTS

| | | | |
|---|---|---|---|
| 2,934,966 | 5/1960 | Wood | 74—105 |
| 2,970,315 | 2/1961 | De Nicolo | 74—99 |

MILTON KAUFMAN, Primary Examiner

U.S. Cl. X.R.

239—265.39